United States Patent
Kimura

(10) Patent No.: US 9,443,287 B2
(45) Date of Patent: Sep. 13, 2016

(54) IMAGE PROCESSING METHOD AND APPARATUS USING TRAINED DICTIONARY

(71) Applicant: CANON KABUSHIKI KAISHA, Tokyo (JP)

(72) Inventor: Yoshinori Kimura, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/612,756

(22) Filed: Feb. 3, 2015

(65) Prior Publication Data
US 2015/0227819 A1    Aug. 13, 2015

(30) Foreign Application Priority Data

Feb. 7, 2014 (JP) ................. 2014-022034

(51) Int. Cl.
*G06K 9/00* (2006.01)
*G06T 5/00* (2006.01)
*G06T 3/40* (2006.01)

(52) U.S. Cl.
CPC ................. *G06T 5/002* (2013.01); *G06K 9/00* (2013.01); *G06T 3/4053* (2013.01); *G06T 2207/20081* (2013.01)

(58) Field of Classification Search
CPC ................... G06N 99/005; A61B 2019/5265; G06K 9/00771; G06K 9/6256; G06K 9/4642; G06K 9/66; G06K 9/6249; G06K 2009/4666; G06K 9/00375; G06K 9/00671; G06K 9/46; H04N 19/126; H04N 13/0459; G06T 2207/20081; G06T 2207/10016; G06T 15/00; H01L 27/14609; G06F 17/30253; G06F 17/30265; G06F 17/30256; G06F 3/011; G10L 2012/105

USPC ....... 382/159, 254, 260, 165, 155, 201, 206, 382/209; 348/143; 345/419
See application file for complete search history.

(56) References Cited

U.S. PATENT DOCUMENTS 5,345,536 A * 9/1994 Hoshimi ................. G10L 15/10
                                                            704/243
6,671,404 B1 * 12/2003 Kawatani ............. G06K 9/6279
                                                            382/190

(Continued)

OTHER PUBLICATIONS

Yang et al. "Couple Dictionary Training for Image Super-Resolution", Transactions on Image Processing, IEEE, vol. 21, Issue 8, Apr. 3, 2012, p. 3467-3478, U.S.A.

(Continued)

*Primary Examiner* — Vu Le
*Assistant Examiner* — Aklilu Woldemariam
(74) *Attorney, Agent, or Firm* — Rossi, Kimms & McDowell LLP

(57) ABSTRACT

The image processing method includes providing first dictionaries produced by dictionary learning and second dictionaries corresponding to the first dictionaries, performing, on each first dictionary, a process to approximate the first image by linear combination of elements of the first dictionary so as to produce a linear combination coefficient and thereby acquiring multiple linear combination coefficients, and calculating, for each linear combination coefficient, a ratio between a largest coefficient element and a second-largest coefficient element and selecting a specific linear combination coefficient in which the ratio is largest among the multiple linear combination coefficients. The method further includes selecting, from the multiple second dictionaries, a specific dictionary corresponding to the first dictionary for which the specific linear combination coefficient is produced, and producing the second image by using linear combination of the specific linear combination coefficient and elements of the specific dictionary.

9 Claims, 10 Drawing Sheets

(56) References Cited

U.S. PATENT DOCUMENTS

| | | | | |
|---|---|---|---|---|
| 7,450,032 B1* | 11/2008 | Cormode | ................ | H03M 7/30 341/50 |
| 2002/0152051 A1* | 10/2002 | Fukushige | ........ | G06F 17/30707 702/179 |
| 2003/0161504 A1* | 8/2003 | Inoue | ................ | G06K 9/00221 382/115 |
| 2009/0297038 A1* | 12/2009 | Ishikawa | .............. | G06K 9/3275 382/209 |
| 2010/0046829 A1* | 2/2010 | Mahajan | ................. | G06K 9/40 382/159 |
| 2010/0260354 A1* | 10/2010 | Ozawa | ................ | G10L 21/0208 381/94.4 |
| 2012/0134576 A1* | 5/2012 | Sharma | ................ | G06K 9/4604 382/155 |
| 2013/0129207 A1* | 5/2013 | Liu | ........................... | G06T 5/50 382/165 |
| 2013/0170767 A1* | 7/2013 | Choudhury | ........... | G06T 3/4053 382/260 |
| 2013/0245429 A1* | 9/2013 | Zhang | ................. | A61B 6/5211 600/424 |
| 2014/0037199 A1* | 2/2014 | Aharon | ................. | H04N 19/97 382/159 |
| 2014/0176708 A1* | 6/2014 | Ramakrishnan | ... | G06K 9/00771 348/143 |
| 2015/0015569 A1* | 1/2015 | Jung | ..................... | G06T 15/005 345/419 |

OTHER PUBLICATIONS

Elad et al. "Image Denoising Via Sparse and Redundant Representations Over Learned Dictionaries", Transactions on Image Processing, IEEE, vol. 15, Issue 12, Dec. 2006, p. 3736-3745, U.S.A.

\* cited by examiner

IMAGE PROCESSING METHOD AND APPARATUS USING TRAINED DICTIONARY

BACKGROUND OF THE INVENTION

1. Field of the Invention

The present invention relates to an image processing technique for converting a given known image into an unknown image with high accuracy.

2. Description of the Related Art

As an image processing method for converting a known image into an unknown image, Jianchao Yang, Zhaowen Wang, Zhe Lin, Scott Cohen and Thomas Huang, "Couple Dictionary Training for Image Super-Resolution", Transactions on Image Processing, U.S.A., IEEE, 2012, Vol. 21, Issue8, p. 3467-3478 (hereinafter referred to as "Document 1") discloses so-called super-resolution processing to produce, from a low-resolution image produced through a degradation process such as pixel decimation from a high-resolution image, the high-resolution image on which the degradation process is not performed. Specifically, the super-resolution processing first performs an interpolation process such as a nearest neighbor method on the low-resolution image to produce a high-resolution intermediate image. The intermediate image is smoothed due to the interpolation process, so that the super-resolution processing next arbitrarily extracts a small area (patch) from the intermediate image and converts the patch into an unsmoothed corresponding patch of a high-resolution image to be produced. Performing such processes on the entire intermediate image enables producing the high-resolution image (super-resolution image).

On the other hand, Michael Elad and Michal Aharon, "Image Denoising Via Sparse and Redundant Representations Over Learned Dictionaries", Transactions on Image Processing, U.S.A, IEEE, 2006, Vol. 15, Issue 12, p. 3736-3745 (hereinafter referred to as "Document 2") discloses a so-called noise removal process to acquire, from a degraded image containing noise, an original image not containing the noise. Specifically, the noise removal process first converts a patch arbitrarily extracted from the degraded image into a corresponding patch not containing the noise in the original image to be produced. Performing such a process on the entire degraded image produces the original image with the noise removed.

As just described above, conventional image processing methods perform a process to convert the patch extracted from the degraded image into the corresponding patch of the original image not having been degraded and thereby produce the high-resolution image or the noise-removed image.

The image processing methods disclosed in Documents 1 and 2 use a dictionary beforehand produced by dictionary learning (or dictionary training) from multiple patches extracted from a training image not having been degraded or from a set of training images having been and not being degraded. Such image processing methods are each called an image processing method based on sparse expression or sparse coding used in the following description. The dictionary means a set of elements that are multiple patches produced as a result of the dictionary learning. The training image means an image to be used for producing the dictionary by the dictionary learning.

However, the image processing methods disclosed in Documents 1 and 2 cannot convert an arbitrary known image (hereinafter referred to as "a first image") into an arbitrary unknown image (hereinafter referred to as "a second image") with high accuracy. The image processing method disclosed in Document 2 can convert the patch extracted from the degraded image into the corresponding patch in the original image and, however, cannot in principle convert the arbitrary first image into the arbitrary second image. In addition, the image processing method disclosed in Document 1 can merely convert the arbitrary first image into the arbitrary second image and, however, cannot perform the conversion with high accuracy.

SUMMARY OF THE INVENTION

The present invention provides an image processing method and an image processing apparatus capable of converting a known image into an unknown image with high accuracy.

The present invention provides as an aspect thereof an image processing method of converting a first image into a second image. The method includes providing multiple first dictionaries produced by dictionary learning and multiple second dictionaries corresponding to the first dictionaries, performing, on each of the multiple first dictionaries, a process to approximate the first image by linear combination of elements of the first dictionary so as to produce a linear combination coefficient and thereby acquiring multiple linear combination coefficients, calculating, for each of the multiple linear combination coefficients, a ratio between a largest coefficient element whose absolute value is largest among coefficient elements of the linear combination coefficient and a second-largest coefficient element whose absolute value is second-largest thereamong and selecting a specific linear combination coefficient in which the ratio is largest among the multiple linear combination coefficients, selecting, from the multiple second dictionaries, a specific dictionary corresponding to the first dictionary for which the specific linear combination coefficient is produced, and producing the second image by using linear combination of the specific linear combination coefficient and elements of the specific dictionary.

The present invention provides as another aspect thereof a non-transitory computer-readable storage medium storing an image processing program as a computer program to cause a computer to execute image processing using the above image processing method.

The present invention provides as still another aspect thereof an image processing apparatus configured to perform an image process to convert a first image into a second image. The apparatus includes a provider configured to provide multiple first dictionaries produced by dictionary learning and multiple second dictionaries corresponding to the first dictionaries, a coefficient calculator configured to perform, on each of the multiple first dictionaries, a process to approximate the first image by linear combination of elements of the first dictionary so as to produce a linear combination coefficient and thereby acquiring multiple linear combination coefficients, a coefficient selector configured to calculate, for each of the multiple linear combination coefficients, a ratio between a largest coefficient element whose absolute value is largest among coefficient elements of each linear combination coefficient and a second-largest coefficient element whose absolute value is second-largest thereamong and selecting a specific linear combination coefficient in which the ratio is largest among the multiple linear combination coefficients, a dictionary selector configured to select, from the multiple second dictionaries, a specific dictionary corresponding to the first dictionary for which the specific linear combination coefficient is produced, and an image producer configured to produce the second image by using linear combination of the specific linear combination coefficient and elements of the specific dictionary.

Further features of the present invention will become apparent from the following description of exemplary embodiments with reference to the attached drawings.

DESCRIPTION OF THE EMBODIMENTS

Exemplary embodiments of the present invention will be described below with reference to the attached drawings.

Embodiment 1

Figure 1:
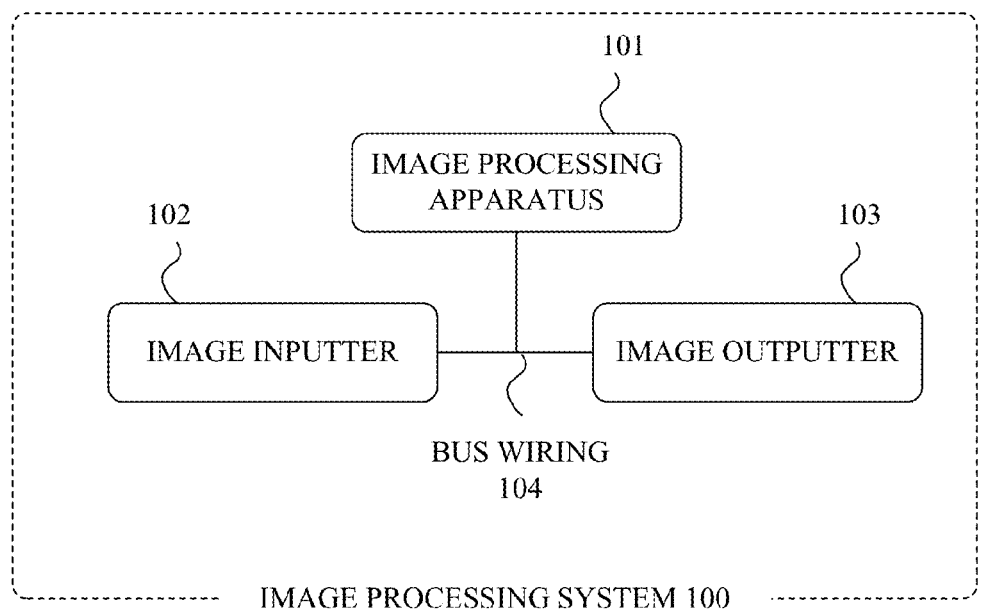
FIG. 1 is a block diagram illustrating a configuration of an image processing system that is Embodiment 1 of the present invention.

FIG. 1 illustrates a configuration of an image processing apparatus as a first embodiment (Embodiment 1) of the present invention. An image processing apparatus 101 constitutes an image processing system 100 together with an image inputter 102 and an image outputter 103. The image processing apparatus 101 is connected to the image inputter 102 and the image outputter 103 via a bus wiring 104.

The image inputter 102, which is constituted by an image capturing apparatus such as a digital camera and a slide scanner, inputs an image produced by image capturing (the image is hereinafter referred to as "an input image") to the image processing apparatus 101. The slide scanner performs image capturing of a pathology specimen used for pathological diagnosis to produce an image. The image inputter 102 may be constituted by an interface device such as a USB interface and an optical drive each capable of reading the input image from a storage medium such as a USB memory, a DVD and a CD-ROM. Alternatively, the image inputter 102 may include a multiple number of these devices.

The input image described in this embodiment is a monochrome image having two-dimensionally arrayed data of luminance values or a color image having two-dimensionally arrayed data of luminance values for each of RGB colors. A color space showing the color image is not limited to the RGB color space, and may be other color spaces such as a YCbCr color space and a HSV color space.

The image outputter 103 is constituted by a display device such as a liquid crystal display and outputs an image produced by the image processing apparatus 101 (the image is hereinafter referred to as "an output image"). Alternatively, the image outputter 103 may be constituted by the interface device such as the USB interface and the optical drive each capable of writing the output image to the storage medium such as the USB memory and the DVD. Still alternatively, the image outputter 103 may be constituted by a storage device such as a HDD capable of storing the output image. Moreover, the image outputter 103 may include a multiple number of these devices. Furthermore, the image processing apparatus 101 may be constituted as an image capturing apparatus such as a digital camera by including therein the image inputter 102 and the image outputter 103.

The image processing system 100 includes a controller constituted by a CPU or the like, a temporary storage unit constituted by a RAM or the like, and an input device constituted by a keyboard or the like, each of which is not illustrated in FIG. 1.

Figure 2:
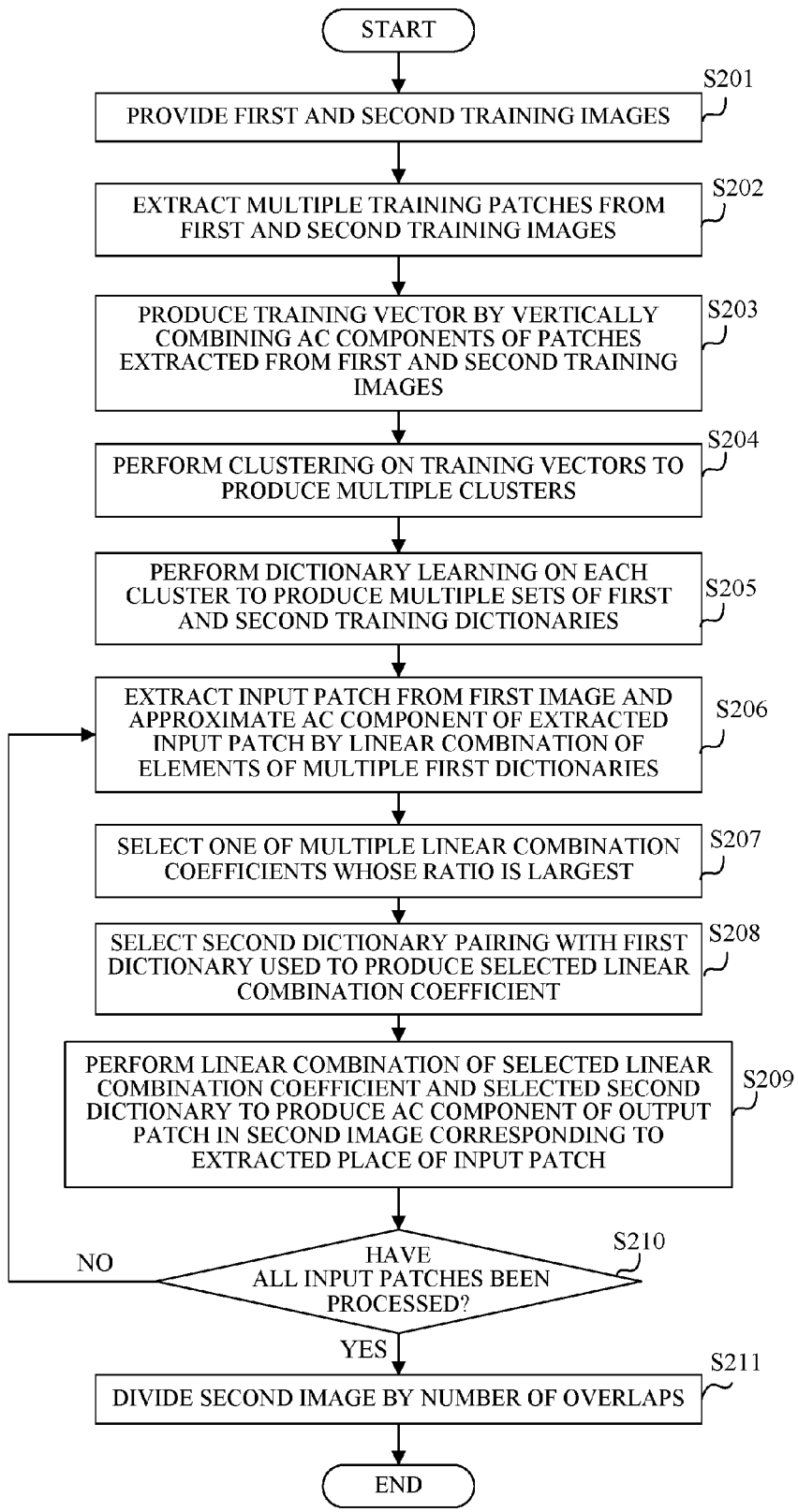
FIG. 2 is a flowchart illustrating a procedure of image processing performed in Embodiment 1.

Next, description will be made of image processing (image processing method) performed by the image processing apparatus 101 of this embodiment with reference to a flowchart illustrated in FIG. 2. The image processing apparatus 101 is constituted by a computer and performs image processing to convert a known input image (hereinafter referred to as "a first image") into an unknown output image (hereinafter referred to as "a second image") according to an image processing program as a computer program. The image processing apparatus 101 serves as a provider, a coefficient calculator, a coefficient selector, a dictionary selector and an image producer.

In the following description, the first and second images have sizes identical to each other. That is, when p represents number of pixels in a vertical direction and q represents number of pixels in a horizontal direction, the first and second images each have p×q pixels. Although this embodiment will describe a case where the first image is a monochrome image, the image processing of this embodiment is applicable also to a case where the first image is a color image.

First, at step S201, the image processing apparatus 101 provides (prepares) a first training image and a second training image. The first training image is an image similar to (in other words, relevant to) the first image on which the image processing is to be performed, and the second training image is an image similar to the second image that is a result of the image processing. For instance, when the first image that is an image of a flower (flower image) is to be converted into the second image that is an image of a person (person image), the image processing apparatus 101 provides the flower image as the first training image and provides the person image as the second training image.

Next, at step S202, the image processing apparatus 101 extracts multiple patches (hereinafter each referred to as "a first training patch") as multiple first training partial images from multiple randomly selected places in the first training image. Moreover, the image processing apparatus 101 extracts multiple patches (hereinafter each referred to as "a second training patch") as multiple second training partial images from places corresponding (identical) to the extracted places of the multiple first training patches in the first training image. The multiple first training patches (places) extracted from the first training image may partially overlap one another but must not fully overlap one another.

In addition, the multiple first training patches must have sizes identical to one another, and each of the first training patches must have a size smaller than that of the first training image and sides each constituted by two or more pixels. The size of each of the first and second training patches is also p×q pixels where p represents the number of pixels in the vertical direction and q represents the number of pixels in the horizontal direction.

Next, at step S203, the image processing apparatus 101 calculates an AC component (first AC component) of each of the first training patches extracted from the first training image, by subtracting, from pixel values distributed in each first training patch, an average pixel value (hereinafter referred to as "a DC component") of the first training patch. The image processing apparatus 101 also calculates, in a same manner, an AC component (second AC component) of each of the second training patches extracted from the second training image.

Then, the image processing apparatus 101 converts the AC components of the first and second training patches corresponding (whose extracted places are identical) to each other into vectors to produce AC vectors and vertically combines (concatenates) the AC vectors together to produce a training vector. The image processing apparatus 101 performs this process on all the multiple first and second training patches corresponding to each other to produce multiple training vectors.

Next, at step S204, the image processing apparatus 101 performs a process called clustering on the produced multiple training vectors to produce multiple vector sets each called a cluster containing mutually similar training vectors.

Description will now be made of the clustering. The clustering is a process to classify a set of data into the clusters, which are multiple subsets each containing multiple mutually similar data. One representative of clustering algorithms is a k-means method. The k-means method performs the clustering by updating a representative value (centroid) in each cluster so as to minimize a distance between the centroid and other data in the cluster. Although the k-means method is used as the clustering algorithm in this embodiment, other algorithms may alternatively be used. In this embodiment, the cluster produced as a result of the clustering is specifically a matrix produced by horizontally combining (concatenating) mutually similar training vectors among the multiple training vectors produced at step S203. In the following description, the matrix (cluster) is referred to as "a training matrix."

Next, at step S205, the image processing apparatus 101 performs a process called dictionary learning on each cluster and thereby produces (provides) a first dictionary and a second dictionary for each cluster. If having produced M (multiple) training matrices (clusters), the image processing apparatus 101 produces M (same multiple number of) sets of first and second dictionaries.

Description will now be made of the dictionary learning. The dictionary learning is a process to produce the first and second dictionaries from the training matrix. Two examples of a dictionary learning algorithm are "joint sparse coding" and "coupled dictionary training" disclosed in Document 1.

The joint sparse coding first produces one dictionary matrix from the training matrix by a K-SVD method or the like. The K-SVD method, which is one of algorithms to produce the dictionary matrix from the training matrix, is most commonly used in the sparse coding. Although the K-SVD method is used in the dictionary learning in this embodiment, other algorithms may alternatively be used.

In the dictionary matrix produced in the joint sparse coding, an upper half part corresponds to the first training image, and a lower half part corresponds to second the training image. Next, the joint sparse coding extracts the upper half part of the produced dictionary matrix and converts column vectors of the extracted matrix into patches. A set of the converted patches corresponds to the first dictionary. Moreover, the joint sparse coding extracts the lower half part of the produced dictionary matrix and converts column vectors of the extracted matrix into patches. A set of the converted patches corresponds to the second dictionary. The patches each have a size identical to that of each training patch extracted at step S202. Number of the patches that are elements of each of the first and second dictionaries is beforehand specified by a user.

The processes described above are assumed that the first and second training patches extracted from the first and second training images have sizes identical to each other. When the first and second training patches have different sizes from each other, description will be made of differences of the processes as needed. The process to extract the parts of the dictionary matrix and converts the column vectors of the extracted matrix into the patches is not necessarily required to be performed. Depending on a purpose, a set of the column vectors may be treated as a dictionary without performing the process to convert the column vectors into the patches.

The coupled dictionary training performs the dictionary learning by a different method from that of the joint sparse coding. However, this embodiment uses the joint sparse coding, and thus description of the coupled dictionary training will be omitted. Using any one of the joint sparse coding and the coupled dictionary training enables producing a dictionary that can provide a same effect.

The processes at steps S201 to S205 are not necessarily required to be performed by the image processing apparatus 101. Alternatively, after the processes are performed by the user, sets of produced multiple first and second dictionaries may be stored in the image processing apparatus 101. The image processing apparatus 101 may then perform processes at step S206 and subsequent steps by using the stored sets of the multiple first and second dictionaries.

At step S206, the image processing apparatus 101 extracts a patch (first patch; hereinafter referred to as "an input patch") from an arbitrary place of the first image. Then, the image processing apparatus 101 approximates an AC component of the extracted input patch by linear combination of elements of the multiple first dictionaries to acquire multiple linear combination coefficients. That is, the image processing apparatus 101 acquires, when producing M first dictionaries, M linear combination coefficients.

In this embodiment, the approximation by the linear combination means expressing the AC component of the extracted input patch by a weighted sum of the elements (patches) of the first dictionary dictionaries. Weights in this weighted sum are the linear combination coefficients. The patch of the first dictionary has a size identical to that of the patch extracted at step S202. The approximation by the linear combination is expressed by the following expression (1):

$$b \approx \alpha_{i1}a_{i1} + \alpha_{i2}a_{i2} + \ldots \alpha_{in}a_{in} \quad (1)$$

where $a_{ij}$ (j=1 to n) represents a j-th element in an i-th dictionary of the multiple first dictionaries, $\alpha_{ij}$ (j=1 to n) represents a weight (linear combination coefficient) on the element $a_{ij}$, b represents the AC component of the input patch extracted from the first image, and n represents a total number of elements of the first dictionary.

Algorithms for the linear combination of the elements of the dictionary to approximate the patch extracted from the image include orthogonal matching pursuit (OMP) disclosed in Document 2. Although this embodiment uses the OMP when performing the approximation of the extracted patch by the linear combination of the elements of the dictionary, other algorithms may alternatively be used.

Next, at step S207, the image processing apparatus 101 selects a specific linear combination coefficient that is one of the multiple linear combination coefficients whose linear combination coefficient ratio is largest. The linear combination coefficient ratio means a ratio (absolute value) between, among elements (coefficient elements) of the linear combination coefficient, a largest element whose absolute value is largest and a second-largest element whose absolute value is second-largest. When there are two or more linear combination coefficients whose each linear combination coefficient ratio is largest, the image processing apparatus 101 arbitrarily selects one of them. The linear combination coefficient ratio is expressed by the following expression (2):

$$r_i = \left| \frac{\alpha_{i\_1}}{\alpha_{i\_2}} \right| \quad (2)$$

where $r_i$ represents a ratio of an i-th linear combination coefficient of the multiple linear combination coefficients, $\alpha_{i\_1}$ represents a largest element (coefficient element) whose absolute value is largest among elements of the i-th linear combination coefficient, and $\alpha_{i\_2}$ represents a second-largest element whose absolute value is second-largest among the elements of the i-th linear combination coefficient.

At step S208, the image processing apparatus 101 selects the first dictionary used to produce the linear combination coefficient selected at step S207 and the second dictionary (specific dictionary) corresponding to the selected first dictionary. That is, if having selected the i-th linear combination coefficient at step S207, since the image processing apparatus 101 has produced this linear combination coefficient by using the i-th first dictionary, the image processing apparatus 101 selects the i-th second dictionary corresponding to the i-th first dictionary.

At step S209, the image processing apparatus 101 produces, by linear combination of the selected linear combination coefficient (specific linear combination coefficient) and elements of the selected second dictionary (specific dictionary), an AC component of a patch (second patch; hereinafter referred to as "an output patch") in the second image, the output patch corresponding in its place to the input patch. The image processing apparatus 101 adds the produced AC component of the output patch, together with a DC component of the input patch in the first image corresponding to the output patch, to a pixel value of the output patch.

The process to add the DC component of the input patch in the first image to the AC component of the output patch may be omitted or changed depending on a purpose. In addition, in this embodiment, the second image has the size identical to that of the first image as mentioned above, and an initial pixel value of the second image (that is, of the output patch) is zero. The linear combination of the selected linear combination coefficient and the elements of the selected second dictionary is expressed by the following expression (3):

$$c = \alpha_1 \alpha'_1 + \alpha_2 \alpha'_2 + \ldots \alpha_n \alpha'_n \quad (3)$$

where $a'_j$ (j=1 to n) represents a j-th element of the selected second dictionary, $\alpha_j$ (j=1 to n) represents a j-th element of the selected linear combination coefficient, c represents the AC component of the output patch in the second image corresponding in its place to the input patch, and n represents a total number of elements of the selected second dictionary.

Next, at step S210, the image processing apparatus 101 determines whether or not the processes at steps S206 to S209 for all the input patches extracted from the first image have been completed. The image processing apparatus 101 returns to step S206 if the processes for all the input patches have not yet been completed to perform the processes at steps S206 to S209 on a next input patch. The image processing apparatus 101 proceeds to step S211 if the processes for all the input patches have been completed. When the image processing apparatus 101 extracts the input patches from the first image, the input patches may partially overlap one another but must cover the entire first image without any space.

At step S211, the image processing apparatus 101 divides a summed pixel value at a place where the output patches mutually overlap in the second image at step S209 by the number of the overlaps.

The above-described procedure enables converting the first image as a known first image into the second image as an unknown image with high accuracy.

Applications of the image processing method of this embodiment will be described below.

Embodiment 2

Figure 3:
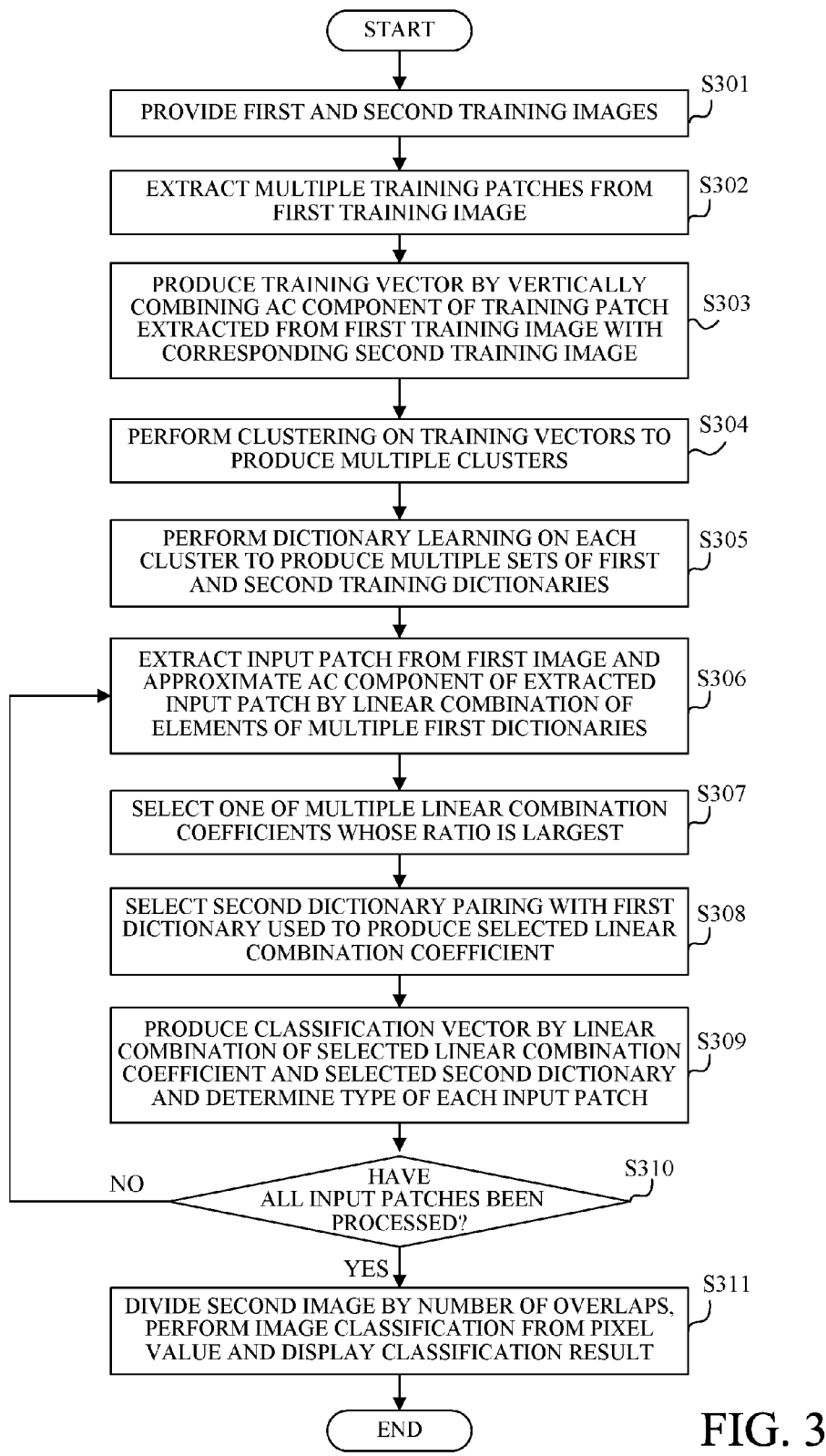
FIG. 3 is a flowchart illustrating a procedure of image processing performed in Embodiment 2 of the present invention.

In a second embodiment (Embodiment 2), an image processing apparatus 101 performs, according to a flowchart illustrated in FIG. 3, image classification on a first image and then converts the first image into a second image depending on a result of the image classification. The image classification is a technique to classify multiple object images (object images produced by image capturing) included in the first image into any one of predetermined types and to display a result of the classification as the second image (classified image). For instance, the image classification divides a first image including an image of a person (hereinafter referred to as "a person image" or simply as "a person") and an image of a flower (hereinafter referred to as "a flower image or simply as "a flower") as the object images are present into a person area and a flower area and produces a second image in which the person area is colored in red and the flower area is colored in blue. The object images to be classified are, of course, not limited to the person and the flower. In addition, other methods of displaying the classification result than coloring the object images in red and blue may be employed. This embodiment will describe a method of classifying the first image into the person (face) area and the flower area and displaying the classification result as the second image.

First, at step S301, the image processing apparatus 101 provides first training images and second training images. In the image classification, the first training images are images containing multiple types of object images to be classified. Since the person and the flower are to be classified in this embodiment, the image processing apparatus 101 provides the person image and the flower image as the first training images. In the image classification, the second training images are vector data. Specifically, the image processing apparatus 101 provides, as the second training images, first vector data corresponding to the person image and second vector data corresponding to the flower image.

Figure 4A:
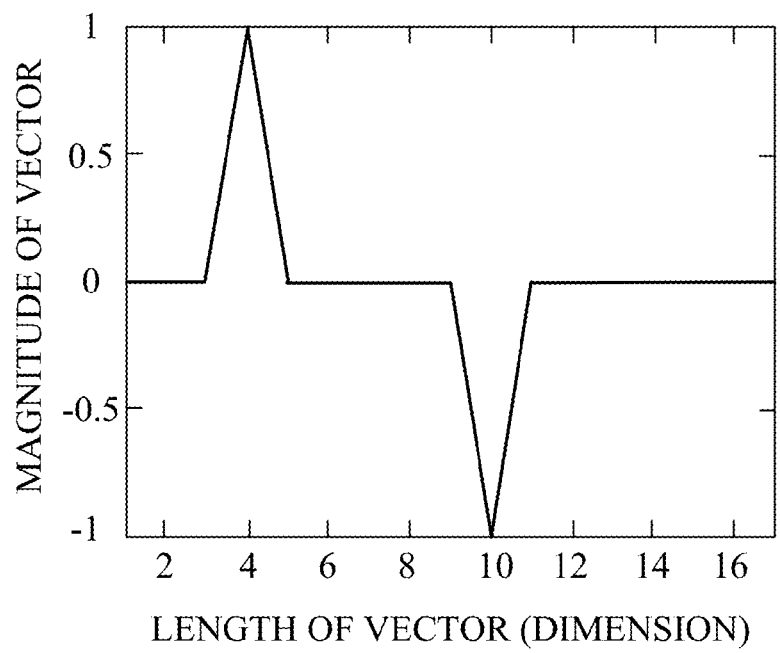
FIGS. 4A and 4B illustrate vector data used in Embodiment 2.
Figure 4B:
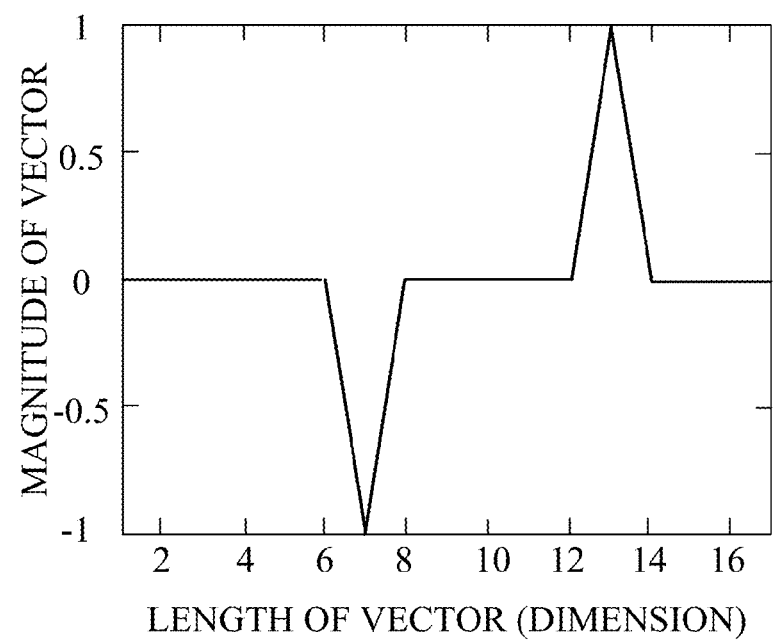

The first vector data and the second vector data may be arbitrary vector data as long as they can be distinguished from each other, and they need to have lengths identical to each other. That is, the image classification as used in this embodiment is to convert a certain image into vector data corresponding thereto. Specifically, the image classification converts the person (face) image into the first vector data and converts the flower image into the second vector data. In this embodiment, as the first vector data and the second vector data, seventeen-dimensional vectors illustrated in FIGS. 4A and 4B are used. FIG. 4A illustrates the first vector data, and FIG. 4B illustrates the second vector data. The vector data is not limited to the seventeen-dimensional data, and may be two- or more-dimensional data.

Next, at step S302, the image processing apparatus 101 extracts multiple training patches, which are multiple training partial images, from each of the first training images. As described in Embodiment 1, each training patch must have a size smaller than that of the first image and sides each constituted by two or more pixels. In this embodiment, each training patch have a size of 8×8 pixels as an example. A rule of extracting the training patch is same as the rule of extracting the first training patches described at step S202 of Embodiment 1.

Next, at step S303, the image processing apparatus 101 calculates an AC component of each of the multiple training patches extracted from the first training images by a method same as that at step S203 of Embodiment 1. Furthermore, the image processing apparatus 101 converts the AC component of each of the training patches into a vector to produce an AC vector. Thereafter, the image processing apparatus 101 vertically combines (concatenates) the AC vector of each of the training patches with the first or second vector data, which is the second training image corresponding to the object image from which the training patches are extracted, to produce a training vector. That is, the image processing apparatus 101 combines (concatenates) the first vector data with the AC vector acquired by converting the AC component of the training patch extracted from the person image among the first training images to produce the training vector. On the other hand, the image processing apparatus 101 combines (concatenates) the second vector data with the AC vector acquired by converting the AC component of the training patch extracted from the flower image among the first training images to produce the training vector.

At step S304, the image processing apparatus 101 performs the clustering on the multiple training vectors by the method described at step S204 of Embodiment 1 to produce multiple clusters each containing mutually similar training vectors.

At step S305, the image processing apparatus 101 performs the dictionary learning on each of the clusters by the method described at step S205 of Embodiment 1 to produce first and second dictionaries for each of the clusters. As described in Embodiment 1, if having produced M clusters, the image processing apparatus 101 produces M sets of the first and second dictionaries. In this embodiment, as an example, the image processing apparatus 101 produces ten clusters. It is known that, as the total number of elements of each of the first and second dictionaries increases, the image processing accuracy is more improved. However, increase of the total number of the elements requires a longer calculation time to produce them, which slows the processing. In this embodiment, the total number of the elements of each of the first and second dictionaries, as an example, is 1024.

Since the method of the dictionary learning has been described at step S205 of Embodiment 1 by regarding the first and second training patches extracted from the first and second training images as having the sizes identical to each other, the first and second dictionaries produced as a result of the dictionary learning have sizes (sizes and number of the elements) identical to each other.

In contrast, at step S305, each training patch extracted from the first training image has a size of 8×8 pixels, and the second training image (first and second vector data) has a size of 17×1 pixels. For this reason, the first and second dictionaries produced as a result of the dictionary learning have sizes different from each other. Specifically, the first dictionary contains 1024 elements whose each size is 8×8 pixels, and the second dictionary contains 1024 elements whose each size is 17×1 pixels.

In addition, the process to produce the first and second dictionaries from the dictionary matrix produced as a result of performing the dictionary learning on each cluster at step S205 is different from that at step S305. At step S205 of Embodiment 1, the image processing apparatus 101 produces the first and second dictionaries by regarding the upper half and the lower half parts of the training matrix as corresponding respectively to the first dictionary and the second dictionary. On the other hand, at step S305, the image processing apparatus 101 produces the first and second dictionaries by regarding 1st to 64th columns and 65th to 81st columns of the training matrix as corresponding respectively to the first dictionary and the second dictionary. As just described above, when the patches extracted from the training image have sizes different from each other, the process in the dictionary learning at step S205 and that at step S305 are mutually slightly different accordingly.

Similarly to Embodiment 1, the processes at steps S301 to S305 described above are not necessarily required to be performed by the image processing apparatus 101. Alternatively, after the processes are performed by the user, sets of produced multiple first and second dictionaries may be stored in the image processing apparatus 101. The image processing apparatus 101 may then perform processes at step 306 and subsequent steps by using the stored sets of the first and second dictionaries.

At step S306, the image processing apparatus 101 extracts an input patch as a partial image from an arbitrary place in the first image and then approximates an AC component of the extracted input patch by linear combination of the elements of the multiple first dictionaries to acquire multiple linear combination coefficients. In this process, when M first dictionaries are produced, M linear combination coefficients are acquired. The approximation by the linear combination at this step is performed by the same method as that described at step S206 of Embodiment 1. In addition, the extracted input patch has the identical size to that of the training patch extracted at step S302.

Next, at step S307, the image processing apparatus 101 selects a specific linear combination coefficient that is one of the multiple linear combination coefficients whose linear combination coefficient ratio is largest. The linear combination coefficient ratio is calculated by the same method as that described at step S207 of Embodiment 1.

Next, at step S308, the image processing apparatus 101 selects the first dictionary used to produce the selected linear combination coefficient and the second dictionary (specific dictionary) corresponding to the first dictionary.

Figure 5:
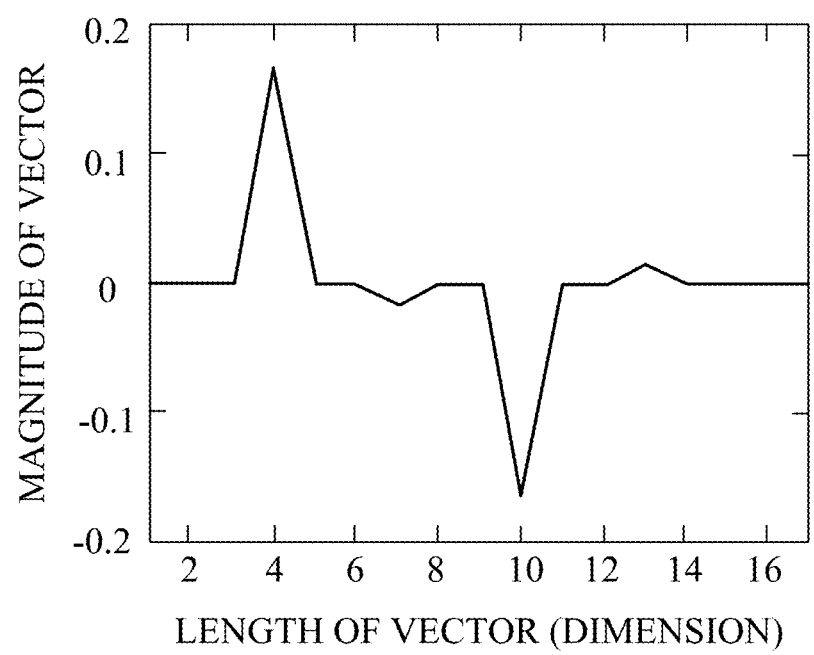
FIG. 5 illustrates one of classification vectors produced in Embodiment 2.

Next, at step S309, the image processing apparatus 101 produces, by linear combination of the selected linear combination coefficient (specific linear combination coefficient) and the elements of the selected second dictionary (specific dictionary), a classification vector. The linear combination at this step is performed by the same method as that described at step S209 of Embodiment 1. The classification vector is a vector used to classify the input patches extracted from the first image. FIG. 5 illustrates an example of the produced classification vector.

Furthermore, the image processing apparatus 101 compares the classification vector with the first and second vector data to determine a type of the object image in the input patch. Specifically, if the classification vector and the first vector data are similar to each other (that is, if the classification vector has a higher degree of similarity to the first vector data than to the second vector data), the image processing apparatus 101 classifies the input patch into the person. If the classification vector and the second vector data are similar to each other (that is, if the classification vector has a higher degree of similarity to the second vector data than to the first vector data), the image processing apparatus 101 classifies the input patch into the flower. Examples of a method of comparing the classification vector with the first and second vector data (that is, a method of determining the degree of similarity) include a method focusing on a position of a non-zero vector element and a method focusing on a difference between the classification vector and each of the first and second vector data. In this embodiment, the image processing apparatus 101 compares the classification vector to each of the first and second vector data, focusing on the position of the non-zero vector element. The comparison method is not limited to this, and any method may be used that can determine the degree of similarity of vectors.

Furthermore, if having classified the input patch extracted from the first image into the person, the image processing apparatus 101 adds a classified patch (output patch) as a partial image whose size is identical to that of the input patch and whose all pixel values are −1 to pixel values at a place (area) in the second image correspond to the input patch. On the other hand, if having classified the input patch extracted from the first image into the flower, the image processing apparatus 101 adds a classified patch whose each size is identical to that of the input patch and whose all pixel values are +1 to pixel value at a place (area) in the second image correspond to the input patch. As described in Embodiment 1, the second image (classified patch) has the size identical to that of the first image and has an initial pixel value of zero. In addition, the pixel value of the classified patch added to the second image is not limited to −1 and +1. Even if the input patches are extracted from partially overlapping areas in the first image, any pixel value is applicable as long as the classifications at places in the second image corresponding to these input patches can be recognized. For instance, a pixel value of +i or −i where i is an imaginary unit may be used.

Next, at step S310, the image processing apparatus 101 determines whether or not the processes at steps S306 to S309 for all the input patches extracted from the first image have been completed. When the processes for all the input patches have not yet been completed, the image processing apparatus 101 returns to step S306 to perform the processes at steps S306 to S309 on a next input patch. When the processes for all the input patches have been completed, the image processing apparatus 101 proceeds to step S311. As described in Embodiment 1, when the image processing apparatus 101 extracts the input patches from the first image, the input patches may partially overlap one another and must cover the entire first image without any space.

At step S311, the image processing apparatus 101 divides a summed pixel value at a place where the output patches mutually overlap in the second image at step S309 by the number of the overlaps. Furthermore, the image processing apparatus 101 classifies, in the second image, each area whose pixel value is positive into the flower and each area whose pixel value is negative into the person. At this step, in determining whether the pixel value of each of the areas is positive or negative, the image processing apparatus 101 decides the classification at the place having the summed pixel value because the classified patches mutually overlap, by means of majority decision.

The image processing apparatus 101 then displays the classification result as a difference of colors by, for example, coloring the person in red and the flower in blue. The method of displaying the classification result is not limited to displaying the difference of colors, and other display methods may be used.

According to the above-described procedure, the image processing apparatus 101 performs the image classification on the first image and then converts the first image into the second image showing the result of the classification.

Figure 6A:
FIGS. 6A to 6E illustrate a result of image classification performed using the image processing of Embodiment 2.
Figure 6D:
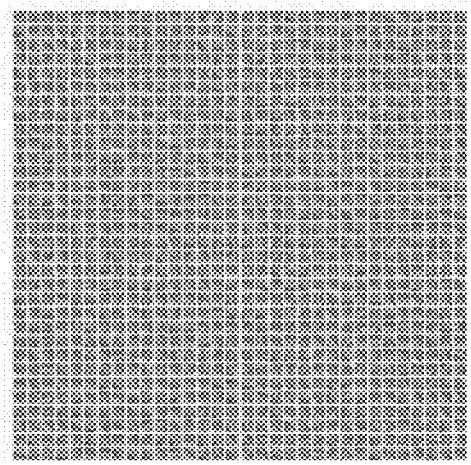
Figure 6B:
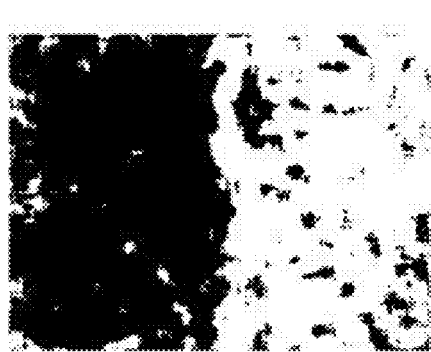

FIGS. 6A to 6E illustrate an example of the image classification performed by using the image processing method of this embodiment. FIG. 6A illustrates the first image (input image) whose left half part and right half part are respectively the person and the flower. FIG. 6B illustrates the second image (classified image) showing a result of the image classification of the first image. The second image is colored in black when the classification result is the person and colored in white when the classification result is the flower.

Figure 6E:
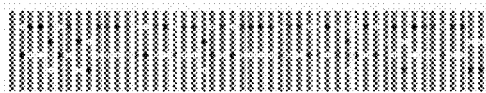
Figure 6C:

FIG. 6C illustrates a true classified image. FIG. 6D illustrates one of the first dictionaries. FIG. 6E illustrates one of the second dictionaries. All of the images are normalized such that they each have a maximum pixel value of 1 and a minimum pixel value of 0. Their size is 185×246 pixels. The first dictionary illustrated in FIG. 6D is constituted by 32 vertically arranged elements and 32 horizontally arranged elements, each element having 8×8 pixels. The second dictionary illustrated in FIG. 6E is constituted by first 50 elements horizontally arranged, each element having 17×1 pixels.

An erroneous classification rate calculated by actually comparing the true classified image illustrated in FIG. 6C with the classified image produced by the image processing apparatus 101 and illustrated in FIG. 6B was 11.2%. This shows that the image processing method of this embodiment enables performing the image classification with high accuracy.

Next, description will be made of a result of verification of superiority of the image processing method of this embodiment over a conventional image processing method. First, referring to a flowchart illustrated in FIG. 7, description will be made of the conventional image processing method that performs image classification on a first image and then converts the first image into a second image.

At step S701, as at step S301, a conventional image processing apparatus provides first and second training images. Specifically, the image processing apparatus provides the person image and the flower image as the first training images and provides first vector data and second vector data, as the second training images, respectively corresponding to the person and the flower. The first and second training images same as those used at step S301 were used at this step for accurate comparison.

Next, at step S702, as at step S302, the image processing apparatus extracts multiple first training patches from each of the first training images. The first training patches extracted at this step each have a size identical to that of the training patch extracted at step S302.

Next, at step S703, as at step S303, the image processing apparatus calculates an AC component of each of multiple first training patches extracted from each of the first training images. Next, the image processing apparatus produces training vectors, each produced by vertically combining (concatenating) a vector converted from the AC component of each of the first training patches with the second training image (first or second vector data) corresponding to an object image from which the first training patches are extracted.

Next, at step S704, the image processing apparatus produces a training matrix by horizontally combining (concatenating) the training vectors and performs the dictionary learning on the training matrix to produce a first dictionary and a second dictionary. At this step, the total number of elements of each of the first and second dictionaries is 529.

Next, at step S705, the image processing apparatus extracts an input patch from an arbitrary place in the first image and then approximates an AC component of the extracted input patch by the linear combination of the elements of the first dictionary to acquire a linear combination coefficient. The approximation by the linear combination at this step is performed by the same method as that described at step S206 of Embodiment 1. In addition, the extracted input patches each have a size identical to that of the first training patch extracted at step S702.

Next, at step S706, the image processing apparatus produces, by linear combination of the linear combination coefficient and the elements of the second dictionary, a classification vector. The linear combination at this step is performed by the same method as that described at step S209 of Embodiment 1. In addition, classifying the input patches from the produced classification vectors to produce the second image at this step is performed by the same method as that described at step S309.

Next, at step S707, the image processing apparatus determines whether or not the processes of steps S705 and S706 for all the input patches extracted from the first image have been completed. When the processes for all the input patches have not yet been completed, the image processing apparatus returns to step S705 to perform the processes of steps S705 and step S706 on a next input patch. When the processes for all the input patches have been completed, the image processing apparatus proceeds to step S708. Also at this step, when the image processing apparatus extracts the input patches from the first image, the input patches may partially overlap one another but must cover the entire first image without any space.

At step S708, the image processing apparatus divides a summed pixel value at a place where the output patches mutually overlap in the second image at step S706 by the number of the overlaps.

Figure 7:
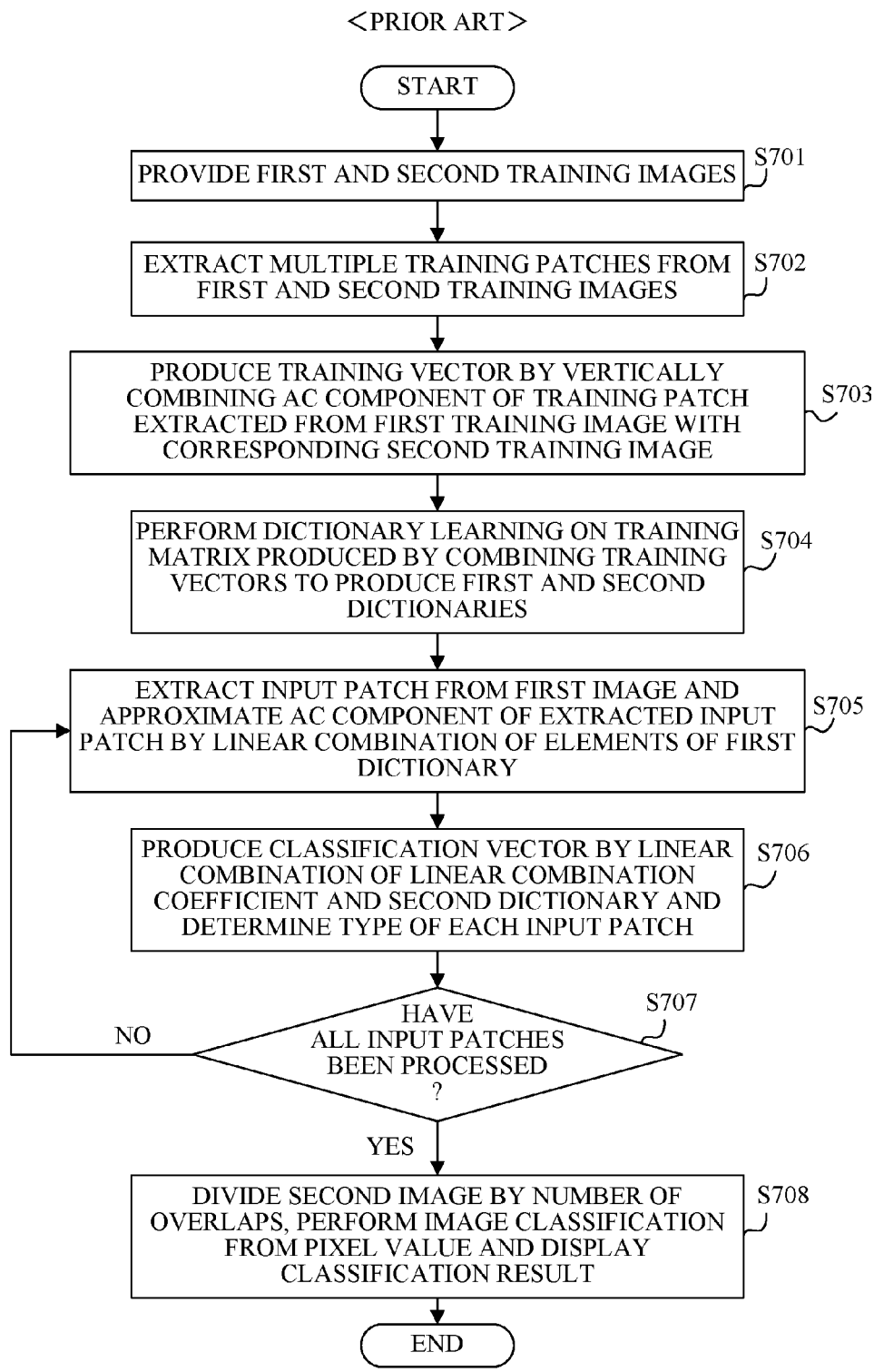
FIG. 7 a flowchart illustrating a procedure of the image classification performed using a conventional image processing method.
Figure 8A:
FIGS. 8A to 8E illustrate a result of the image classification performed using the conventional image processing method.
Figure 8D:
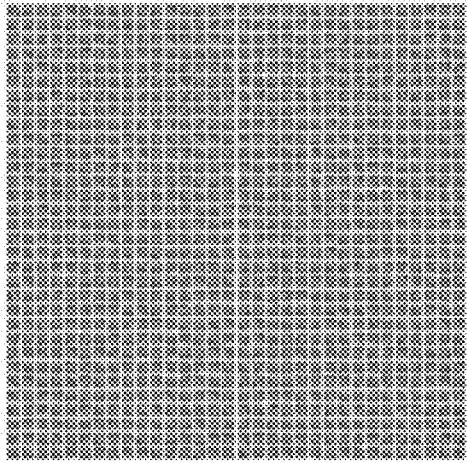
Figure 8B:

FIGS. 8A to 8E illustrate an example of the image classification of the first image (input image) performed by using the image processing method illustrated in FIG. 7 and the conversion of the first image into the second image (classified image). FIG. 8A illustrates, as FIG. 6A, the input image whose left half part and right half part are respectively the person and the flower. FIG. 8B illustrates, as FIG. 6B, the classified image colored in black when the classification result is the person and colored in white when the classification result is the flower.

Figure 8E:
Figure 8C:
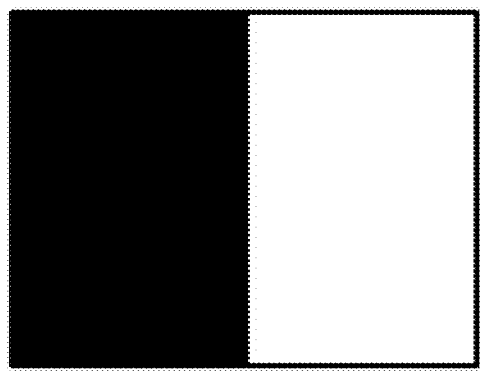

FIGS. 8C, 8D and 8E respectively illustrate a true classified image, the first dictionary and the second dictionary. All of the images are normalized such that they have a maximum pixel value of 1 and a minimum pixel value of 0. Furthermore, all of the images have a size of 185×246 pixels. The first dictionary illustrated in FIG. 8D is constituted by 23 vertically arranged elements and 23 horizontally arranged elements, each element having 8×8 pixels. The second dictionary illustrated in FIG. 8E is constituted by first 50 elements horizontally arranged, each element having 17×1 pixels.

An erroneous classification rate calculated by actually comparing the true classified image illustrated in FIG. 8C with the classified image produced by the conventional image processing apparatus and illustrated in FIG. 8B was 20%. This shows superiority of the image processing method of this embodiment over the conventional image processing method.

Embodiment 3

As a third embodiment (Embodiment 3) of the present invention, description will be made that the image classification can be performed also on a first image containing objects other than the person and the flower. Specifically, the image classification classifies the first image into either one of a zebra or a muscat and outputs a result of the classification as a second image. The image classification of this embodiment is performed by the same method as that described in Embodiment 2 with reference to the flowchart of FIG. 3.

Figure 9A:
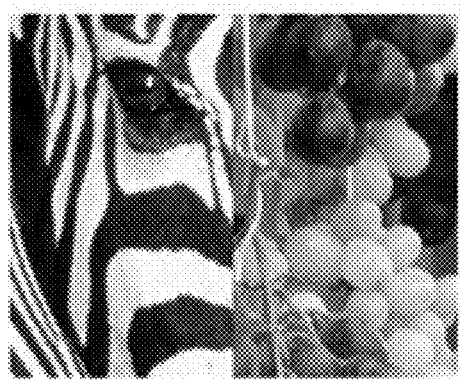
FIGS. 9A to 9E illustrate a result of the image classification by image processing performed in Embodiment 3 of the present invention.
Figure 9D:
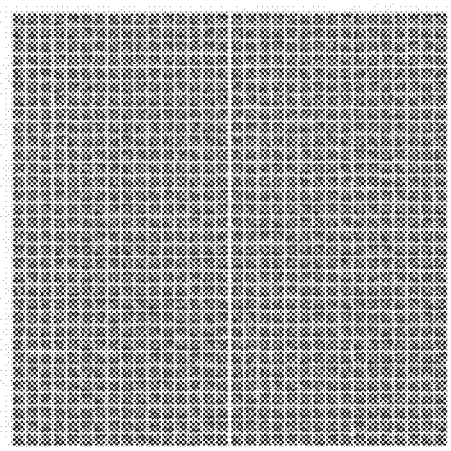
Figure 9B:
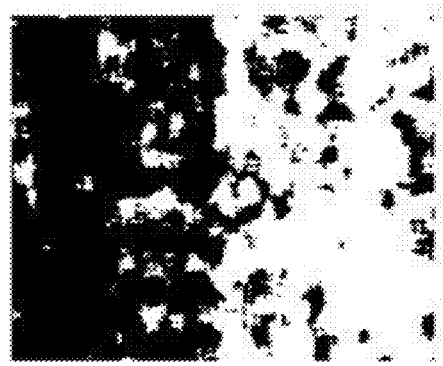

FIGS. 9A to 9E illustrate an example of the image classification performed in this embodiment. FIG. 9A illustrates the first image (input image) whose left half part and right half part are respectively the zebra and the muscat. FIG. 9B illustrates the second image (classified image) showing the result of the image classification. The classified image is colored in black when the classification result is the zebra and colored in white when the classification result is the muscat.

Figure 9E:
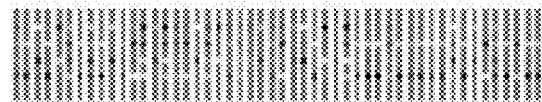
Figure 9C:

FIGS. 9C, 9D and 9E respectively illustrate a true classified image, one of first dictionaries and one of second dictionaries. Also in this embodiment, all of the images are normalized such that they have a maximum pixel value of 1 and a minimum pixel value of 0. In addition, all of the images each have a size of 178×220 pixels. Furthermore, the first dictionary illustrated in FIG. 9D is constituted by 32 vertically arranged elements and 32 horizontally arranged elements, each element having 8×8 pixels. The second dictionary illustrated in FIG. 9E is constituted by first 50 elements horizontally arranged, each element having 17×1 pixels.

An erroneous classification rate calculated by actually comparing the true classified image illustrated in FIG. 9C with the classified image produced in this embodiment and illustrated in FIG. 9B was 14.7%.

Figure 10A:
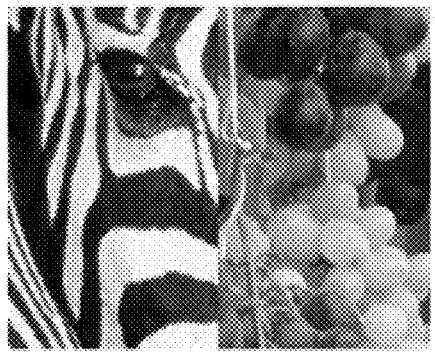
FIGS. 10A to 10E illustrate a result of the image classification using the conventional image processing method.
Figure 10D:
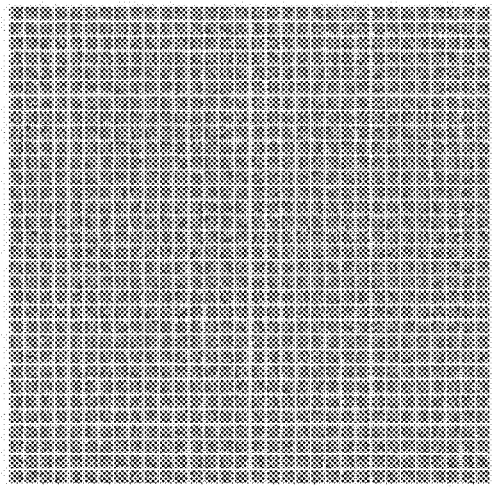
Figure 10B:

FIGS. 10A to 10E illustrate an example of image classification using a conventional image processing method for a purpose of comparison to the image classification of this embodiment. FIG. 10A illustrates, as FIG. 9A, the input image whose left half part and right half part are respectively the zebra and muscat. FIG. 10B illustrates a classified image produced by a conventional image processing method. As FIG. 9B, the classified image is colored in black when the classification result is the zebra and colored in white when the classification result is the muscat.

Figure 10E:
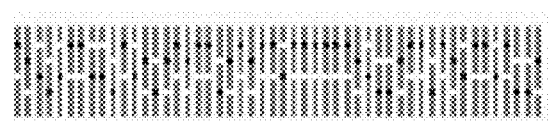
Figure 10C:
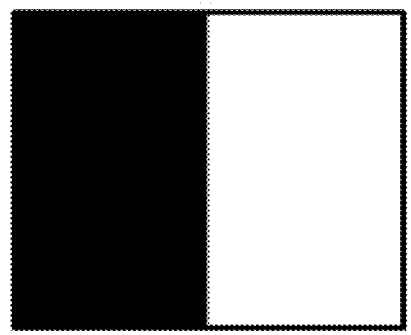

FIGS. 10C, 10D and 10E respectively illustrate a true classified image, a first dictionary and a second dictionary. All of the images are normalized such that they have a maximum pixel value of 1 and a minimum pixel value of 0. All of the images each have a size of 178×220 pixels. Furthermore, the first dictionary illustrated in FIG. 10D is constituted by 32 vertically arranged elements and 32 horizontally arranged elements, each element having 8×8 pixels. The second dictionary illustrated in FIG. 10E is constituted by first 50 elements horizontally arranged, each element having 17×1 pixels.

An erroneous classification rate calculated by actually comparing the true classified image illustrated in FIG. 10C with the classified image produced by the conventional image processing method and illustrated in FIG. 10B was 21.1%. This shows superiority of the image classification of this embodiment over the conventional image processing method and generality thereof.

Each of the above-described embodiments can produce an unknown second image by converting a known first image into the second image with high accuracy.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-022034, filed on Feb. 7, 2014, which is hereby incorporated by reference herein in its entirety.

What is claimed is:

1. An image processing method that uses a processor to convert an image, the method comprising:

performing, on each of multiple first dictionaries produced by dictionary learning, a process to approximate a first image by linear combination of elements of the first dictionary so as to produce a linear combination coefficient and thereby acquiring multiple linear combination coefficients;

calculating, by the processor and for each of the multiple linear combination coefficients, a ratio between a largest coefficient element and a second-largest coefficient element among respective coefficient elements of the respective linear combination coefficients, the largest coefficient element having an absolute value that is largest among the respective coefficient elements and the second-largest coefficient element having an absolute value that is second-largest among the respective coefficient elements, thereby obtaining respective ratios of the multiple linear combination coefficients;

selecting a specific linear combination coefficient, among the multiple linear combination coefficients, having the ratio that is largest among the respective ratios of the multiple linear combination coefficients;

selecting, from multiple second dictionaries corresponding to the first dictionaries, a specific dictionary corresponding to the first dictionary for which the specific linear combination coefficient is selected; and converting the first image into a second image by using linear combination of the specific linear combination coefficient and elements of the specific dictionary.

2. The image processing method according to claim 1 further comprising:

providing a first training image relevant to the first image and a second training image relevant to the second image;

extracting multiple first training partial images from the first training image;

extracting multiple second training partial images from places corresponding to extracted places of the multiple first training partial images in the first training image;

subtracting, from pixel values distributed in each of the multiple first and second training partial images, an average value of the pixel values to produce an AC component;

converting the AC component of each first training partial image and the AC component of each second training partial image into vectors to produce AC vectors;

performing, on each of pairs of the first and second training partial images whose extracted areas correspond to each other, a process to combine the AC vectors of the pair of the first and second training partial images together so as to produce a training vector and thereby producing multiple training vectors;

clustering the training vectors to produce multiple clusters each containing the training vectors similar to one another;

performing, on each of the multiple clusters, a process to produce a dictionary matrix from the cluster by using a dictionary learning algorithm so as to produce multiple dictionary matrices; and producing the first and second dictionaries from each of the dictionary matrices.

3. The image processing method according to claim 1, wherein:

the second image is an image showing a result of classifying multiple types of object images contained in the first image, and the method further comprises:
providing the multiple first and second dictionaries produced by the dictionary learning that uses a first training image relevant to the first image and multiple vector data as a second training image showing the types of the respective object images;
performing, on each of the multiple first dictionaries, a process to approximate a partial image extracted from the first image by the linear combination of the elements of the first dictionary so as to produce a linear combination coefficient and thereby acquiring the multiple linear combination coefficients, and then selecting the specific linear combination coefficient from the multiple linear combination coefficients;
producing a classification vector by using the linear combination of the specific linear combination coefficient and the elements of the specific dictionary and determining the type of the object image in the partial image by using the classification vector;
performing, on each of the partial images plurally extracted from the entire first image, the selection of the specific linear combination coefficient and the determination of the type of the object image using the classification vector and the multiple vector data; and
producing the second image depending on the type of the object image determined in each of the partial images.

4. The image processing method according to claim 3, wherein the method determines, as the type of the object image, a type shown by one of the multiple vector data in which a degree of similarity of the classification vector is highest.

5. The image processing method according to claim 3, further comprising:
extracting multiple training partial images from the first training image;
producing an AC component that is acquired by subtracting, from pixel values distributed in each of the multiple training partial images, an average of the pixel values;
converting the AC component of each of the multiple training partial images into a vector to produce an AC vector;
performing, on each of the multiple training partial images, a process to combine the AC vector with the vector data showing the type of the object image of the training partial image from which the AC vector is produced so as to produce a training vector and thereby producing multiple training vectors;
clustering the multiple training vectors to produce multiple clusters each containing the training vectors similar to one another;
performing, on each of the multiple clusters, a process to produce a dictionary matrix from the cluster by using a dictionary learning algorithm to produce multiple dictionary matrices; and
producing the first and second dictionaries from each of the multiple dictionary matrices.

6. A non-transitory computer-readable storage medium storing an image processing program as a computer program to cause a computer to execute image processing, the image processing comprising:
performing, on each of multiple first dictionaries produced by dictionary learning, a process to approximate a first image by linear combination of elements of the first dictionary so as to produce a linear combination coefficient and thereby acquiring multiple linear combination coefficients;
calculating, for each of the multiple linear combination coefficients, a ratio between a largest coefficient element and a second-largest coefficient element among respective coefficient elements of the respective linear combination coefficients, the largest coefficient element having an absolute value that is largest among the respective coefficient elements and the second-largest coefficient element having an absolute value that is second-largest among the respective coefficient elements, thereby obtaining respective ratios of the multiple linear combination coefficients;
selecting a specific linear combination coefficient, among the multiple linear combination coefficients, having the ratio that is largest among the respective ratios of the multiple linear combination coefficients;
selecting, from multiple second dictionaries corresponding to the first dictionaries, a specific dictionary corresponding to the first dictionary for which the specific linear combination coefficient is selected; and
converting the first image into a second image by using linear combination of the specific linear combination coefficient and elements of the specific dictionary.

7. The non-transitory computer-readable storage medium according to claim 6,
wherein:
the second image is an image showing a result of classifying multiple types of object images contained in the first image, and
the image processing further comprises:
providing the multiple first and second dictionaries produced by the dictionary learning that uses a first training image relevant to the first image and multiple vector data as a second training image showing the types of the respective object images;
performing, on each of the multiple first dictionaries, a process to approximate a partial image extracted from the first image by the linear combination of the elements of the first dictionary so as to produce a linear combination coefficient and thereby acquiring the multiple linear combination coefficients, and then selecting the specific linear combination coefficient from the multiple linear combination coefficients;
producing a classification vector by using the linear combination of the specific linear combination coefficient and the elements of the specific dictionary and determining the type of the object image in the partial image by using the classification vector;
performing, on each of the partial images plurally extracted from the entire first image, the selection of the specific linear combination coefficient and the determination of the type of the object image using the classification vector and the multiple vector data; and
producing the second image depending on the type of the object image determined in each of the partial images.

8. An image processing apparatus configured to perform image processing to convert an image, the image processing apparatus comprising:
a coefficient calculator configured to perform, on each of multiple first dictionaries produced by dictionary learning, a process to approximate a first image by linear combination of elements of the first dictionary so as to produce a linear combination coefficient and thereby acquiring multiple linear combination coefficients;
a coefficient selector configured to calculate, for each of the multiple linear combination coefficients, a ratio between a largest coefficient element and a second-largest coefficient element among respective coefficient elements of the respective linear combination coefficients, the largest coefficient element having an absolute value that is largest among the respective coefficient elements and the second-largest coefficient element having an absolute value that is second-largest among the respective coefficient elements, thereby obtaining respective ratios of the multiple linear combination coefficients, and to select a specific linear combination coefficient, among the multiple linear combination coefficients, having the ratio that is largest among the respective ratios of the multiple linear combination coefficients;

a dictionary selector configured to select, from multiple second dictionaries corresponding to the first dictionaries, a specific dictionary corresponding to the first dictionary for which the specific linear combination coefficient is selected; and an image producer configured to convert the first image into a second image by using linear combination of the specific linear combination coefficient and elements of the specific dictionary.

9. The image processing apparatus according to claim 8, wherein:

the second image is an image showing a result of classifying multiple types of object images contained in the first image, and further comprising a provider configured to provide the multiple first and second dictionaries produced by the dictionary learning that uses a first training image relevant to the first image and multiple vector data as a second training image showing the types of the respective object images;

wherein:

the coefficient calculator is configured to perform, on each of the multiple first dictionaries, a process to approximate a partial image extracted from the first image by the linear combination of the elements of the first dictionary so as to produce a linear combination coefficient and thereby acquiring the multiple linear combination coefficients, and then selecting the specific linear combination coefficient from the multiple linear combination coefficients; and the image producer is configured (a) to producing a classification vector by using the linear combination of the specific linear combination coefficient and the elements of the specific dictionary and determining the type of the object image in the partial image by using the classification vector, (b) to perform, on each of the partial images plurally extracted from the entire first image, the selection of the specific linear combination coefficient and the determination of the type of the object image using the classification vector and the multiple vector data, and (c) to produce the second image depending on the type of the object image determined in each of the partial images.

* * * * *